United States Patent [19]
Yamamoto et al.

[11] Patent Number: 6,069,111
[45] Date of Patent: May 30, 2000

[54] CATALYSTS FOR THE PURIFICATION OF EXHAUST GAS AND METHOD OF MANUFACTURING THEREOF

[75] Inventors: Shinji Yamamoto, Yokosuka; Toru Sekiba, Yokohama, both of Japan

[73] Assignee: Nissan Motor Co., Ltd., Yokohama, Japan

[21] Appl. No.: 08/976,496

[22] Filed: Nov. 24, 1997

Related U.S. Application Data

[63] Continuation-in-part of application No. 08/655,815, May 31, 1996, abandoned.

[30] Foreign Application Priority Data

Jun. 2, 1995 [JP] Japan ..................... 7-136575

[51] Int. Cl.$^7$ ............ B01J 23/44; B01J 23/32; B01J 23/42
[52] U.S. Cl. ............ 502/333; 502/324; 502/327; 502/334; 502/337; 502/339; 502/341
[58] Field of Search ................ 502/333, 324, 502/326, 327, 328, 332, 334, 335, 336, 337, 338, 339, 341

[56] References Cited

U.S. PATENT DOCUMENTS

| | | | |
|---|---|---|---|
| 4,102,813 | 7/1978 | Kimura et al. | 252/430 |
| 4,188,309 | 2/1980 | Volker et al. | 252/466 J |
| 4,228,039 | 10/1980 | Senes et al. | 252/462 |
| 4,440,874 | 4/1984 | Thompson | 502/327 |
| 4,448,895 | 5/1984 | Ono et al. | 502/304 |
| 4,868,150 | 9/1989 | Spooner et al. | 502/439 |
| 4,985,387 | 1/1991 | Prigent et al. | 502/304 |

FOREIGN PATENT DOCUMENTS

| | | |
|---|---|---|
| 56-010333 | 2/1981 | Japan . |
| 58-020307 | 4/1983 | Japan . |
| 5-305236 | 11/1993 | Japan . |
| 6-000378 | 1/1994 | Japan . |

OTHER PUBLICATIONS

Fumio Munakata et al., Effects of La–Deficiency and Substitution of Fe for Co in Solid–State Reaction between LaCoO$_{3-\delta}$ and Al$_2$O$_3$, Journal of the Ceramic Society of Japan, Int. Edition vol. 103, pp. 1031–1035, 1995 no month.

*Primary Examiner*—John F. Niebling
*Assistant Examiner*—Alexander G. Ghyka
*Attorney, Agent, or Firm*—Foley & Lardner

[57] ABSTRACT

The catalyst for the purification of exhaust gas in the form of monolithically-constructed catalyst with a catalyst component-loaded layer contains at least palladium and metallic aluminate powder as catalyst components, which metallic aluminate powder containing at least one element selected from the group consisting of cobalt, nickel and zinc. The method of manufacturing the catalyst for the purification of exhaust gas is characterized in that an alumina composite oxide is obtained by dissolving or dispersing fine grain alumina hydrate colloid and a water-soluble salt of at least one selected from the group consisting of cobalt, nickel and zinc into water, drying it by removing water, and then conducting calcining thereof.

13 Claims, No Drawings

CATALYSTS FOR THE PURIFICATION OF EXHAUST GAS AND METHOD OF MANUFACTURING THEREOF

The application is a continuation-in-part of Ser. No. 08/655,815 filed on May 31, 1996 now abandoned. Ser. No. 08/655,815 is incorporated in its entirety, including the specification, claims and abstract.

BACKGROUND OF THE INVENTION

1. Field of the Invention

The present invention relates to catalysts for the purification of exhaust gas and a method of manufacturing thereof; and more particularly relates to catalysts for the purification of exhaust gas having an excellent low temperature activity thereby being capable of efficiently purifying hydrocarbon (hereinafter referred to as "HC"), carbon monoxide (hereinafter referred to as "CO") and nitrogen oxide (hereinafter referred to as "$NO_x$") in exhaust gas discharged from an internal-combustion engine for automobiles and the like at low temperature as well as excellent catalytic activity under all exhaust gas composition atmospheres such as an oxidizing atmosphere, reducing atmosphere, theoretical air-fuel ratio atmosphere and the like, and a method of manufacturing such catalysts.

2. Description of the Related Art

Conventionally, the low temperature period from the time just after the start-up of an internal-combustion engine to the time when the catalytic temperature reaches a reaction temperature for the purification of exhaust gas, is not sufficient for purifying exhaust gas. Thus, the development of a catalyst which has an ability to purify exhaust gas from a low temperature is desirable.

Catalyst for the purification of exhaust gas are disclosed in Japanese Patent Application Publications No. 58-20307, Japanese Patent Application Opened Nos. 5-305236 and 6-378 and so on.

The catalyst for the purification of exhaust gas described in Japanese Patent Application Publication No. 58-20307 loads a composition consisting of platinum, rhodium and cerium with a refractory carrier. This catalyst essentially has a structure loading a platinum group elements such as platinum, palladium and rhodium on alumina, cerium oxide and the like and coating it onto a monolithic carrier.

Japanese Patent Application Opened No. 5-305236 discloses a catalyst for the purification of exhaust gas prepared by mixing and dispersing hexaaluminate which includes no noble metals into noble metal-loaded alumina such as platinum-, rhodium-, palladium-loaded alumina and the like. This catalyst is essentially a hexaaluminate composition having a specific composition mixed with alumina loading at least one noble metal selected from the group consisting of platinum, rhodium and palladium at a specific weight ratio.

Japanese Patent Application Opened No. 6-378 proposes a catalyst for the purification of exhaust gas incorporating, as a catalyst component, at least one of platinum and palladium and at least one metal oxide selected from the group consisting of potassium, cesium, strontium and barium as a basic element on activated alumina and cerium oxide. That is, said catalyst comprises a combination of at least one basic element selected from the group consisting of potassium compound, cesium compound, strontium compound and barium compound in addition to the platinum element, active alumina, cerium oxide and the like hitherto used as catalyst components.

The aforementioned catalysts use a great amount of noble metals, but these noble metals are not abundant and are expensive. Therefore, it is desired to develop a high performance catalyst with less of a noble metal content used as a three-way catalyst capable of purifying exhaust gas. However, in the case of a lower noble metal content, the purification ability of the catalyst is lowered when the exhaust gas atmosphere becomes a reducing atmosphere. Also, low temperature activity and purification performance are decreased.

In a reducing atmosphere in which oxygen concentration is not sufficient for purification of hydrocarbon, a part of hydrocarbon is not purified and the unpurified hydrocarbon is strongly adsorbed onto the noble metal to lower its activity or to reduce active point. As a result, the purification performance is considerably lowered. Particularly, in case of a lowered content of palladium, the above deleterious effects appear conspicuously, resulting in the purification performance being further lowered.

Moreover, a catalyst for the purification of exhaust gas should purify the exhaust gas of an automobile having a widely varying composition within a wide temperature range from a low temperature region to a high temperature region at a high purification ratio. However, in purification of exhaust gas by palladium, the purification performance for hydrocarbons is considerably lowered at low temperatures just after starting an engine, or in an atmosphere of high hydrocarbon concentration and low oxygen concentration, while in an atmosphere of high oxygen concentration and low hydrocarbon concentration, nitrogen oxide is hard to adsorb since oxygen adsorbs on palladium, resulting in the purification performance for the nitrogen oxide being greatly lowered.

SUMMARY OF THE INVENTION

The aforementioned conventional catalysts use a great amount of noble metals such as platinum, rhodium and the like in order to attain sufficient catalytic activity even at a low temperature, but these noble metals are not abundant and their prices are high.

Therefore, it is desired to develop such catalysts that use less of expensive noble metals by utilizing palladium which is a relatively inexpensive noble metal but still have sufficient purification performance. In the case where rhodium is used, it is desired to reduce the amount of rhodium as much as possible without deteriorating the purification performance of the resulting catalyst. When palladium is used alone, however, the purification ability of the catalyst is lowered when exhaust gas atmosphere becomes a reducing atmosphere. In addition, low temperature activity and purification performance are decreased when the amount of palladium is reduced.

Moreover, a catalyst for the purification of exhaust gas is required to purify the exhaust gas of an automobile having a widely varying composition such as an oxidizing atmosphere, reducing atmosphere, and theoretical air-fuel ratio atmosphere within a wide temperature range from a low temperature region to a high temperature region at a high purification ratio.

However, in purification of exhaust gas by palladium, some hydrocarbons are not purified and the unpurified hydrocarbons are strongly adsorbed onto palladium to lower its activity or to reduce active points at low temperatures just after starting an engine, or in a reducing atmosphere of high hydrocarbon concentration and low oxygen concentration. As a result, the purification performance is considerably lowered. In an oxidizing atmosphere of high oxygen concentration and low hydrocarbon concentration, it is hard for nitrogen oxide to adsorb onto palladium since oxygen adsorbs thereonto, resulting in the purification performance for the nitrogen oxide being greatly lowered.

Further, in case of a lowered content of palladium, the above deleterious effects appear conspicuously, thereby further lowering the purification performance of the catalyst.

It is, therefore, an object of the present invention to provide catalysts for the purification of exhaust gas and a method of manufacturing thereof, in which the noble metal content is greatly decreased as compared with the conventional catalysts but the low temperature activity and catalytic activity are still excellent in all exhaust gas composition atmospheres of automobiles such as an oxidizing atmosphere, reducing atmosphere, theoretical air-fuel ratio atmosphere and the like.

The inventors have made various studies in order to solve the above problems and have found remarkable improvements in catalytic activity at low temperatures as well as in purification performance under all exhaust gas composition atmospheres when an alumina composite oxide containing a transition metal element at a given composition ratio together with palladium are contained in a catalyst component-loaded layer to improve the catalytic activity of palladium. As a result, the present invention has been accomplished.

DETAILED DESCRIPTION OF THE PREFERRED EMBODIMENTS

Catalysts for the purification of exhaust gas according to the present invention are monolithically-constructed catalysts with a catalyst component-loaded layer which comprise at least palladium and metallic aluminate powder as catalyst components. The metallic aluminate powder contains at least one element selected from the group consisting of cobalt, nickel and zinc.

In order to increase the structural stability and BET specific surface area of the catalyst according to the present invention under high temperatures, the catalyst may comprise metallic aluminate powder which is an alumina composite oxide having the following general formula:

wherein, X is at least one element selected from a group consisting of cobalt, nickel and zinc, a, b and c show the atomic ratios of each element, a=0.1–0.8 when b=2.0, and c is an oxygen atomic number necessary for satisfying atomic valence of each of the above components.

The catalyst according to the present invention may comprise an alumina composite oxide containing at least one element selected from the group consisting of cobalt, nickel and zinc which further contains at least one element selected from a group consisting of cerium and zirconium in an amount of 0.1–5 mol % at the metallic conversion with respect to the aluminum content so as to suppress sintering (grain-growth) of palladium loaded on the alumina composite oxide.

The catalyst according to the present invention may further comprise cerium oxide containing 1–40 mol % of at least one element selected from the group consisting of lanthanum, neodymium and zirconium, and 60–98 mol % of cerium at the metallic conversion, to further increase catalytic activity of the catalyst under a reducing atmosphere.

In order to further increase low temperature activity of the catalyst, the catalyst according to the present invention may comprise such alumina composite oxide that contains 30–80 weight % of palladium at the metallic conversion with respect to the total amount of palladium contained in the catalyst component-loaded layer.

The catalyst according to the present invention may further comprise at least one element selected from the group consisting of alkali metal and alkaline earth metal, to further increase low temperature activity and catalytic activity under a reducing (i.e. oxygen-lacking) atmosphere.

The catalyst according to the present invention may preferably further comprise rhodium and alumina powder in order to further increase low temperature activity of the catalyst.

The catalyst according to the present invention may preferably further comprise a zirconium oxide containing 1–40 mol % of at least one element selected from the group consisting of lanthanum, neodymium and cerium, and 60–98 mol % of zirconium at the metallic conversion, to further increase catalytic activity under a reducing (i.e. oxygen-lacking) atmosphere.

The catalyst according to the present invention may provide a rhodium-containing layer and a palladium-containing layer as a single layer or arrange the rhodium containing layer on top of the palladium-containing layer in order to further increase catalytic activity of palladium and rhodium.

The method of manufacturing the catalyst for the purification of exhaust gas according to the present invention is characterized in that an alumina composite oxide is obtained by dissolving or dispersing fine grain alumina hydrate colloid (hereinafter referred to as "alumina sol") and a water-soluble salt of at least one of cobalt, nickel and zinc into water, drying it by removing water, and then conducting sintering thereof.

In the method of manufacturing the catalyst for the purification of exhaust gas according to the present invention, the alumina composite oxide may also be obtained by dissolving or dispersing alumina sol and a water-soluble salt of at least one of cobalt, nickel and zinc into water, and thereafter adding thereto at least one aqueous solution selected from the group consisting of ammonia water, ammonium carbonate and ammonium hydrogencarbonate while regulating the pH of the solution within a range of 7.0–9.0. Drying by removing water, and sintering then follow.

The noble metals contained in the catalyst component-loaded layer of the catalyst according to the present invention include at least palladium.

The amount of the palladium is 0.1–20 g in 1 L volume of the catalyst. When the amount of palladium is less than 0.1 g, low temperature activity and purification performance are not sufficient. On the other hand, the amount exceeds 20 g, dispersibility of palladium becomes worsened, and the catalyst performance is not appreciably improved. Therefore, added palladium exceeding 20 g is economically ineffective.

As a carrier for the palladium, a metallic aluminate, and more specifically an alumina composite oxide is appropriate in order to improve catalyst performance of palladium. For the purpose of improving low temperature activity and purification performance (especially $NO_x$ stationary conversion ability under an oxygen-lacking atmosphere and in the vicinity of theoretical air-fuel ratio) of palladium, the above alumina composite oxide comprises at least one element selected from the group consisting of cobalt, nickel and zinc. The amount of such alumina composite oxide to be used is 10–200 g per 1 L of the catalyst. When the amount is less than 10 g, sufficient catalyst performance improving effect, i.e. such effect that the palladium is activated by the alumina composite oxide, cannot be obtained. On the other hand, when the amount exceeds 200 g, the above catalyst performance improving effect is saturated or lowered catalyst performance is observed conversely.

The catalyst for the purification of exhaust gas improves low temperature activity of palladium by loading palladium onto alumina composite oxide powder, thereby closely contacting the palladium with the alumina composite oxide powder which contains at least one element selected from the group consisting of cobalt, nickel and zinc, and easily moving and discharging lattice oxygen in the alumina composite oxide as well as adsorbed oxygen on the surface thereof through the palladium.

In addition, at least one element selected from the group consisting of cobalt, nickel and zinc which is solid solved in the alumina composite oxide effectively performs a function as active points for $NO_x$ adsorption and the like, thereby improving catalyst performance of palladium under an oxygen-lacking atmosphere as well as in the vicinity of a theoretical air-fuel ratio.

Moreover, in a catalyst for the purification of exhaust gas according to the present invention, the composition of metallic aluminate in the catalyst component is of a=0.1–0.8 when b=2.0 in the aforementioned formula $[X]_aAl_bO_c$.

When a is less than 0.1, the function of the transition metal element selected from the group consisting of Co, Ni and Zn added to the alumina composite oxide is small, and the catalyst cannot obtain a sufficiently improved effect. Thus, there is no difference from the case of alumina ($Al_2O_3$) only.

While when a is more than 0.8, BET specific surface area and structural stability at high temperatures of the alumina composite oxide are lowered. As a result, dispersibility of noble metal is worsened, sufficient performance cannot be obtained in the start-up stage, sintering of noble metal is accelerated in endurance, and performance after endurance becomes worsened.

For the catalyst which defines alumina composite oxide of a specific composition ratio, structural stability at high temperatures and specific surface area are sufficient as compared with metal aluminate ($[X]_1Al_2O_4$) of a stoichiometric ratio, the added element is solid solved in alumina crystalline structure, no oxide is present on the surface and sufficient performance can be obtained.

In the catalyst for the purification of exhaust gas according to the present invention, the alumina composite oxide may further contain at least one element selected from a group consisting of cerium and zirconium in an amount of 0.1–5 mol % at the metallic conversion with respect to the aluminum content. The reason why the amount is limited to 0.1–5 mol % is because sintering suppressing effect of palladium is to be further added to the alumina composite oxide while maintaining catalyst performance improving effect owing to the mutual action (interaction) between palladium and alumina composite oxide.

When the amount is less than 0.1 mol %, Ce and/or Zr addition effect is not shown and there is no difference from the case of aluminum composite oxide only. On the other hand, when the amount exceeds 5 mol %, the above added element completely covers the surface of the alumina composite oxide, thereby deteriorating the function as activated points for $NO_x$ adsorption which perform a promotive function with respect to palladium.

By adding at least one element selected from a group consisting of cerium and zirconium to the alumina composite oxide in advance, cerium and/or zirconium comes into close contact with palladium on the surface of the aluminum composite oxide, thereby suppressing sintering of palladium while improving durability and low temperature activity thereof.

The catalyst for the purification of exhaust gas according to the present invention may further contain cerium oxide in addition to the catalyst components. The cerium oxide contains 1–40 mol % of at least one element selected from the group consisting of lanthanum, neodymium and zirconium and 60–98 mol % of cerium at the metallic conversion.

The reason why the amount of the element is limited to 1–40 mol % is because oxygen occulsionability, BET specific surface area and thermal stability of cerium oxide are remarkably improved by adding at least one element selected from the group consisting of lanthanum, neodymium and zirconium to cerium oxide ($CeO_2$).

When the amount is less than 1 mol %, the result is the same as the case of cerium oxide only, namely, the above-described beneficial effects of the added lanthanum and/or neodymium and/or zirconium are not shown. When the amount is more than 40 mol %, the above effects are saturated or lowered on the contrary.

As described above, the catalyst which further contains cerium oxide containing at least one element selected from the group consisting of lanthanum, neodymium and zirconium in a catalyst composite-loaded layer can suppress lowering of catalyst capacity due to reduction of palladium, since the cerium oxide having high oxygen occlusion easily discharges lattice oxygen and adsorbed oxygen under the reducing (i.e. oxygen-lacking) atmosphere and in the vicinity of a theoretical air-fuel ratio and thus, the oxidative state of palladium becomes suitable for purifying exhaust gas.

The catalyst for the purification of exhaust gas according to the present invention may load 30–80 weight % of palladium at the metallic conversion with respect to the total amount of palladium content onto the alumina composite oxide powder containing at least one element selected from the group consisting of cerium and zirconium in the catalyst component. When the amount of palladium loaded onto the alumina composite oxide powder containing at least one element selected from the group consisting of ceriumand zirconium is less than 30 weight %, improvement in low temperature activity is not sufficient. While the loaded amount is more than 80 weight %, improving effect in $NO_x$ stationary conversion performance is saturated and therefore, palladium exceeding 80 weight % is ineffective.

As described above, the catalyst which contains an alumina composite oxide loaded with 30–80 weight % of palladium at the metallic conversion among the total palladium contained in the catalyst component-loaded layer can obtain sufficient improving effects in low temperature activity and $NO_x$ stationary conversion ability of palladium.

The alkali metal and/or alkaline earth metal to be used in the catalyst for the purification of exhaust gas according to the present invention includes lithium, potassium, cerium, magnesium, calcium, strontium and barium. The content thereof is 1–40 g in 1 L of the catalyst. When less than 1 g, it is impossible to control adsorption poisoning by hydrocarbons and sintering of palladium. When exceeding 40 g, useful effect of increased amount can no longer be obtained and performance is lowered on the contrary.

The above-described palladium, alumina composite oxide powder, further cerium oxide and alkali metal and/or alkaline earth metal added if necessary, are made to closely contact with each other, thereby obtaining a greater purification improving effect. Alkali metals and alkaline earth metals have hydrocarbon-adsorption poisoning reduction ability, such that when these metals are contained in the catalyst component-loaded layer, sintering of palladium is controlled, and activity at low temperatures as well as in an oxygen-lacking atmosphere is further improved.

Moreover, it is possible for the catalyst according to the present invention to further contain rhodium and alumina powder in the catalyst component-loaded layer. The content of rhodium is 0.001–5 g in 1 L volume of catalyst. When the content is less than 0.001 g, low temperature activity improving effect of the rhodium is not sufficiently developed. When the content is more than 5 g, the low temperature activity improving effect is saturated and thus, rhodium exceeding 5 g is ineffective.

As a carrier for loading rhodium, zirconium-containing alumina is appropriate in order to increase dispersibility of rhodium, thereby improving catalyst performance. Particularly, in order to control rhodium to be solid solved in alumina under high temperatures, and to increase durability, zirconium is contained in the above alumina power in an amount of 0.1–10 mol % at the metallic conversion. When zirconium is less than 0.1 mol %, the zirconium amount added to the alumina is too small to obtain sufficient improvement and there is no difference from the case of $Al_2O_3$ only. On the other hand, when zirconium exceeds 10 mol %, physical properties of alumina such as BET specific surface area are lowered, so that dispersibility of noble metal becomes worsened, resulting in insufficient performance. The amount of such alumina powder to be used is 1–100 g per 1 L of catalyst. When the amount is less than 1 g, there cannot be obtained sufficient dispersibility of noble metal, while alumina powder more than 100 g does not exhibit remarkable improvements in catalyst performance.

When rhodium-loaded, zirconium-containing alumina powder is additionally contained in the catalyst component-loaded layer which contains palladium and alumina composite oxide powder, and further cerium oxide, if necessary, the catalyst can have further improved low temperature activity and purification performance in oxygen-lacking atmosphere.

The catalyst for the purification of exhaust gas according to the present invention may further contains zirconium oxide in addition to the above-described catalyst components. Such zirconium oxide contains 1–40 mol % of at least one element selected from the group consisting of lanthanum, neodymium and cerium and 60–98 mol % of zirconium at the metallic conversion. The reason why the amount is limited to 1–40 mol % is because oxygen occulusionability of zirconium oxide ($ZrO_2$), BET specific surface area and thermal stability should be improved remarkably by adding at least one element selected from the group consisting of lanthanum, neodymium and cerium.

In the case of less than 1 mol %, the above properties are not changed compared to the case of zirconium oxide only, and the lanthanum and/or neodymium and/or cerium addition effect is not shown. In the case of more than 40 mol %, the above element addition effect is saturated or lowered conversely.

As described above, when the catalyst component-loaded layer of the catalyst according to the present invention which contains rhodium-loaded, zirconium-containing alumina powder, palladium and alumina composite oxide powder, and if necessary, cerium oxide further contains zirconium oxide containing at least one element selected from the group consisting of lanthanum, neodymium and cerium, the oxidative state of rhodium is made suitable for purifying exhaust gas, and as a result, lowering of catalyst performance due to the reduction of rhodium can be suppressed.

Furthermore, in the catalyst for the purification of exhaust gas according to the present invention, a rhodium-containing catalyst component layer and a palladium-containing catalyst component layer is provided as a single layer or the rhodium-containing layer is arranged on top of the palladium-containing layer in order to efficiently develop synergism of palladium and rhodium. With this structure, catalyst performance of palladium and rhodium can be sufficiently secured.

In the method of manufacturing the catalyst for the purification of exhaust gas according to the present invention, an alumina composite oxide may be obtained by dissolving or dispersing fine grain alumina hydrate colloid (hereinafter referred to as "alumina solo") and a water-soluble salt of at least one of cobalt, nickel and zinc into water, drying it by removing water, and then conducting sintering thereof.

By using alumina sol as an aluminum raw material compound, uniformity of crystalline structure and heat resistance of the resulting alumina composite oxide can be further improved as compared with those alumina composite oxides prepared by using water-soluble salt of aluminum.

Further, in the method of manufacturing the catalyst for the purification of exhaust gas according to the present invention, the alumina composite oxide may also be obtained by dissolving or dispersing alumina sol and a water-soluble salt of at least one of cobalt, nickel and zinc into water, and thereafter adding thereto at least one aqueous solution selected from the group consisting of ammonia water, ammonium carbonate and ammonium hydrogencarbonate while regulating the pH of the solution within a range of 7.0–9.0. Drying by removing water, and sintering then follow.

When the alumina composite oxide is prepared by a precipitation method while using alumina sol as an aluminum raw material compound, a sufficient BET specific surface area can be secured for superior dispersion and loading of palladium.

The alumina composite oxide containing aluminum and at least one element selected from the group consisting of cobalt, nickel and zinc to be used for manufacturing the catalyst for the purification of exhaust gas according to the present invention can be manufactured by optionally combining nitrate, carbonate, ammonium salt, acetate and the like of each of the above elements and alumina sol with each other. Among them, it is particularly preferable to use a water-soluble salt and alumina sol for achieving greater improvement in catalyst performance.

Preparation of this alumina composite oxide is not limited to any specific method. It is possible to appropriately select and use any method from various methods such as known evaporation drying methods, precipitation methods, impregnation methods and the like, as long as the components are not considerably maldistributed. It is preferable to use the precipitation method which particularly adds an aqueous solution of at least one compound selected from the group consisting of ammonia water, ammonium carbonate and ammonium hydrogencarbonate as a precipitating medium after dissolving or dispersing raw materials of the above each element into water for fully securing the BET specific surface area and uniformity of crystalline structure of the alumina composite oxide and uniformly dispersing the noble metals.

In the case of preparing the alumina composite oxide to be used for the catalyst for the purification of exhaust gas according to the present invention, an aqueous solution prepared by dissolving a water-soluble salt of at least one element selected from the group consisting of cobalt, nickel and zinc into pure water, is added to a dispersion prepared by dispersing alumina sol into pure water, and then stirred. In this case, it may be optionally used a single solution solved all catalyst raw materials simultaneously or solutions respectively solved each catalyst raw material. Thereafter, the water is removed and the residue is heat-treated to obtain an alumina composite oxide.

In another preparation case of the alumina composite oxide to be used for the catalyst for the purification of exhaust gas according to the present invention, an aqueous solution prepared by dissolving a water-soluble salt of at least one element selected from the group consisting of cobalt, nickel and zinc into pure water, is firstly added to a dispersion prepared by dispersing alumina sol into pure water, and then stirred. Also in this case, it may be optionally used a single solution solved all catalyst raw materials simultaneously or solutions respectively solved each catalyst raw material.

Then, an aqueous solution of at least one compound selected from the group consisting of ammonia water, ammonium carbonate and ammonium hydrogencarbonate is gradually added to a mixed solution containing the above catalyst raw materials so as to regulate the pH of the solution to a range of 7.0–9.0. Thereafter, the water is removed and the residue is heat-treated to obtain an alumina composite oxide.

When the above ammonia water and ammonium compounds are used as a precipitating medium for the above-described precipitation method, even if cleaning of precipitation cake is insufficient, no metal remains. Even if ammonium compounds (after dropping, it is mainly ammonium nitrate) remain, they can be easily resolved and removed by calcination to follow. Moreover, since alumina sol is used instead of aluminum nitrate, exhaust gas and liquid-waste (waste water) treatments for $NO_x$ and ammonium nitrate derived from catalyst raw materials can be greatly reduced during the drying and calcination of the obtained precipitate.

When the above precipitation method is carried out, metal salt precipitates of each element can be formed by regulating the pH of the solution to a range of 7.0–9.0. If the pH is lower than 7.0, each kind of elements cannot sufficiently form precipitates. When the pH is higher than 9.0, part of the precipitated components may be solved again.

Removal of water can be carried out by suitably selecting known methods such as filtration, evaporation and the like. A first heat treatment for obtaining an alumina composite oxide used in the present invention is not particularly limited, but it is preferable to carry out the heat treatment in air and/or under a blowing air stream at a temperature within a range of 600–1200° C. for instance.

As a method of adding at least one element selected from the group consisting of cerium and zirconium to the above alumina composite oxide, the known impregnation or kneading method can be suitably used. Among them, the impregnation method is particularly preferable for some uses.

Preferably, for the purpose of adding at least one element selected from the group consisting of cerium and zirconium to the above alumina composite oxide, an aqueous solution of water-soluble salt of at least one element selected from the group consisting of cerium and zirconium is impregnated into the alumina composite oxide powder, and then the resulting is dried and calcined. A heat treatment for the alumina composite oxide added with at least one element selected from the group consisting of cerium and zirconium is not particularly limited, but it is preferable to carry out the heat treatment in air and/or under a blowing air stream at a temperature within a range of 400–700° C. for instance.

As a method of loading palladium onto the above-described alumina composite oxide added with at least one element selected from the group consisting of cerium and zirconium, the known impregnation or kneading method can be suitably used. Among them, the impregnation method is particularly preferable.

A heat treatment for the palladium-loaded alumina composite oxide used in the present invention, which also contains at least one element selected from the group consisting of cerium and zirconium, is not particularly limited, but it is preferable to carry out the heat treatment in air and/or under a blowing air stream at a temperature within a range of 400–700° C. after the impregnation and drying.

A preparation of the aforementioned zirconium-containing alumina is not particularly limited. It is possible to appropriately select and use any method from various methods such as known evaporation methods, precipitation methods, impregnation methods and the like, as long as considerably uneven distribution of components does not occur. An impregnation method using such an aqueous solution in which zirconium acetate is solved in water is preferably used for fully securing the BET specific surface area of the alumina powder and uniformly dispersing the loaded noble metals.

Removal of water to follow can be suitably selected and carried out from known methods such as evaporation methods and the like. A heat treatment for the zirconium-containing alumina powder to be used in the present invention is not particularly limited, but it is preferable to carry out the heat treatment in air and/or under a blowing air stream at a temperature within a range of 600–1100° C. after the impregnation and drying.

As raw material of rhodium, use may be made of any water-soluble nitrate, halide, acetate and the like.

As a method of loading rhodium onto the zirconium-added alumina, any method can be suitably selected from impregnation methods, kneading methods and the like. Among them, the use of an impregnation method is particularly preferable.

Removal of water to follow can be suitably selected and carried out from known methods such as evaporation methods and the like. A heat treatment for the rhodium-loaded zirconium-containing alumina powder used in the present invention is not particularly limited, but it is preferable to carry out the heat treatment in air and/or under a blowing air stream at a temperature within a range of 400–700° C. after the impregnation and drying.

Preferably, zirconium oxide powder is further added to the rhodium-loaded zirconium-containing alumina powder. The zirconium oxide powder contains at least one element selected from the group consisting of lanthanum, neodymium and cerium.

In case of adding cerium oxide powder to the catalyst according to the present invention, the cerium oxide strongly maintains rhodium in the oxidative state, so that purification performance is conversely lowered.

On the contrary, by adding such zirconium oxide powder, the oxidative state of rhodium is more effectively maintained to the condition suitable for the purification of exhaust gas.

The thus-obtained catalyst for the purification of exhaust gas according to the present invention can effectively be used with no carrier, but it is preferable to use it as ground slurry to be coated on a catalyst carrier and calcined at 400–900° C. As a catalyst carrier, any one of known catalyst carrier can be suitably selected and used. For example, mention may be made of monolithic carriers made from refractory materials, metallic carriers and the like.

The shape of the above catalyst carrier is not particularly limited, but it is preferable to use a honeycomb form. Catalyst powder is applied to each kind of honeycomb structures for use. As the honeycomb material, cordierite ceramics and the like are generally used, but it is possible to use honeycomb material consisting of metal material such as ferrite stainless steel and the like. Further, it is also possible to mold catalyst powder into honeycomb shape. By selecting a honeycomb structure as the shape of catalyst, the contact area between the catalyst and exhaust gas becomes large and pressure loss can be controlled. Accordingly, the catalyst having such a shape is extremely effective when it is used as a catalyst for the purification of exhaust gas of an automobile.

The amount of a catalyst component-coated layer to be adhered to the honeycomb material is preferably 50–400 g per 1 L of catalyst in total of the whole catalyst component. The greater the amount of the catalyst component-coated layer, the more preferable it is from the aspect of catalyst activity and catalyst life. When the coat layer becomes too thick, however, reaction gases such as HC, CO, NOx and the like cannot sufficiently be made into contact with the catalyst due to poor diffusion of the reaction gases. As a result, increased amount effect for activity is saturated and gas passing resistance becomes greater. Therefore, the amount of the coated layer is preferably 50–400 g per 1 L of the catalyst.

More preferably, alkali metal and/or alkaline earth metal is impregnated and loaded onto the thus-obtained catalyst for the purification of exhaust gas. As such alkali metal and alkaline earth metal, there can be used at least one element selected from the group consisting of lithium, sodium, potassium, cesium, magnesium, calcium, strontium and barium.

Usable compounds of alkali metal and alkaline earth metal are water-soluble ones such as oxides, acetates, hydroxides, nitrates, carbonates and the like. By using such water-soluble compounds, it becomes possible to load alkali metal and/or alkaline earth metal as basic elements in the vicinity of palladium with good dispersibility. In this case, raw material compounds of alkali metal and alkaline earth metal may be contained simultaneously or separately.

Namely, the above wash-coat component-loaded carrier is immersed in an aqueous solution of powder consisting of alkali metal compound and/or alkaline earth metal compound and dried. It is then calcined in air and/or under a blowing air stream at a temperature within a range of 200–600° C.

This is because when raw material compounds of alkali metal and alkaline earth metal are heat treated once at a low temperature to be impregnated in a coating layer under the oxide form, they hardly form a composite oxide even when exposed to a high temperature thereafter.

When such calcining temperature is lower than 200° C., the alkali metal compound and alkaline earth metal compound cannot be made into a sufficient oxide form. On the other hand, when the temperature is higher than 600° C., these raw material salts are rapidly reduced, and the carrier is unfavorably cracked in some cases.

The following examples and comparative examples are given in illustration of the invention and are not intended as limitations thereof. Unless otherwise specified, the word "parts" in the following examples and comparative examples means "parts by weight".

EXAMPLE 1

After adding an aqueous solution prepared by dissolving 485 parts of nickel nitrate in 1000 parts of pure water into a suspension prepared by dispersing 1700 parts of alumina sol of 20 weight % at the alumina ($Al_2O_3$) conversion into 2500 parts of pure water, 5% ammonia water was added thereinto while stirring so as to regulate the pH of the solution to 8.0. This solution was dried at 150° C. for 24 hours, and thereafter, calcined at 400° C. for 2 hours, at 600° C. for 2 hours, then at 800° C. for 4 hours, and $Ni_{0.5}Al_{2.0}O_x$ (Powder A) was obtained.

Next, 1000 parts of $Ni_{0.5}Al_{2.0}O_x$ (Powder A) was added into an aqueous solution prepared by dissolving 79 parts of cerium acetate and 26 parts of zirconium hydroxyacetate into 1000 g of pure water, and mixed while stirring for 2 hours. This suspension was dried at 150° C. for 24 hours, and thereafter, calcined at 400° C. for 2 hours, then at 600° C. for 2 hours, and there was obtained $Ni_{0.5}Al_{2.0}O_x$ containing 2 mol % of cerium and 1 mol % of zirconium at the metallic conversion with respect to the aluminum content (Powder B).

The powder B was immersed in an aqueous solution of palladium nitrate, then dried and calcined at 400° C. for 2 hours to obtain Pd-loaded, Ce.Zr-added nickel aluminate powder (Powder C). The concentration of Pd in this powder C was 1.0 weight %.

Then, 700 parts of the above powder C which was loaded with 1.0 weight % of palladium, 480 parts of another powder (Powder D) which is cerium oxide powder containing 1 mol % (2 weight % when converted to $La_2O_3$) of lanthanum and 32 mol % (25 weight % when converted to $ZrO_2$) of zirconium and loaded with 0.75 parts by weight of palladium, 20 parts of activated alumina, and 1200 parts of nitric acid aqueous solution were charged into a porcelain ball mill, mixed and ground to obtain a slurry. The resulting slurry was applied onto a cordieritic monolithic carrier (1.3 L, 400 cells), and dried and calcined at 400° C. for 1 hour to obtain a catalyst component-loaded cordieritic monolithic carrier having coating weight of 160 g/L and palladium loading amount of 40 g/cf (1.41 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

EXAMPLE 2

Except that $Co_{0.3}Al_{2.0}O_x$ prepared by using 291 parts of cobalt nitrate was used instead of nickel nitrate, a catalyst for the purification of exhaust gas was prepared in the same manner as in Example 1.

EXAMPLE 3

Except that $Zn_{0.3}Al_{2.0}O_x$ prepared by using 299 parts of zinc nitrate was used instead of nickel nitrate, a catalyst for the purification of exhaust gas was prepared in the same manner as in Example 1.

EXAMPLE 4

Except that $Co_{0.1}Ni_{0.3}Al_{2.0}O_x$ prepared by using 291 parts of nickel nitrate and 97 parts of cobalt nitrate was used instead of nickel nitrate, a catalyst for the purification of exhaust gas was prepared in the same manner as in Example 1.

EXAMPLE 5

Except that $Zn_{0.1}Ni_{0.3}Al_{2.0}O_x$ prepared by using 291 parts of nickel nitrate and 100 parts of zinc nitrate was used instead of nickel nitrate, a catalyst for the purification of exhaust gas was prepared in the same manner as in Example 1.

EXAMPLE 6

Except that $Zn_{0.1}Co_{0.1}Ni_{0.3}Al_{2.0}O_x$ prepared by using 291 parts of nickel nitrate, 100 parts of zinc nitrate and 97 parts of cobalt nitrate was used instead of nickel nitrate, a catalyst for the purification of exhaust gas was prepared in the same manner as in Example 1.

EXAMPLE 7

Except that $Ni_{0.7}Al_{2.0}O_x$ obtained with 679 parts of nickel nitrate was used, a catalyst for the purification of exhaust gas was prepared in the same manner as in Example 1.

EXAMPLE 8

Except that $Ni_{0.3}Al_{2.0}O_x$ obtained with 291 parts of nickel nitrate was used, a catalyst for the purification of exhaust gas was prepared in the same manner as in Example 1.

EXAMPLE 9

Except that the applied amount of barium acetate was changed to have the resulting catalyst contain 5 g/L of BaO, a catalyst for the purification of exhaust gas was prepared in the same manner as in Example 1.

EXAMPLE 10

Except that the applied amount of barium acetate was changed to have the resulting catalyst contain 25 g/L of BaO, a catalyst for the purification of exhaust gas was prepared in the same manner as in Example 1.

EXAMPLE 11

An aqueous solution prepared by dissolving 485 parts of nickel nitrate in 1000 parts of pure water was added into a suspension prepared by dispersing 1700 parts of alumina sol of 20 weight % at the alumina ($Al_2O_3$) conversion into 2500 parts of pure water, and stirred for 2 hours. The resulting solution was dried at 150° C. for 24 hours, and thereafter, calcined at 400° C. for 2 hours, at 600° C. for 2 hours, then at 800° C. for 4 hours, and $Ni_{0.5}Al_{2.0}O_x$ (Powder E) was obtained.

Next, 1000 parts of $Ni_{0.5}Al_{2.0}O_x$ powder (Powder E) was added into an aqueous solution prepared by dissolving 79 parts of cerium acetate and 26 parts of zirconium hydroxyacetate into 1000 g of pure water, and mixed while stirring for 2 hours. This suspension was dried at 150° C. for 24 hours, and thereafter, calcined at 400° C. for 2 hours, then at 600° C. for 2 hours, and there was obtained $Ni_{0.5}Al_{2.0}O_x$ containing 2 mol % of cerium and 1 mol % of zirconium at the metallic conversion with respect to the aluminum content (Powder F).

This powder F was immersed in an aqueous solution of palladium nitrate, then dried and calcined at 400° C. for 2 hours to obtain Pd-loaded, Ce.Zr-added nickel aluminate powder (Powder G). The concentration of Pd in this powder G was 1.0 weight %.

Then, 700 parts of the above powder G which was loaded with 1.0 weight % of palladium, 480 parts of another powder (Powder D) which is cerium oxide powder containing 1 mol % (2 weight % when converted to $La_2O_3$) of lanthanum and 32 mol % (25 weight % when converted to $ZrO_2$) of zirconium and loaded with 0.75 parts by weight of palladium, 20 parts of activated alumina, and 1200 parts of nitric acid aqueous solution were charged into a porcelain ball mill, mixed and ground to obtain a slurry. The resulting slurry was applied onto a cordieritic monolithic carrier (1.3 L, 400 cells), and dried and calcined at 400° C. for 1 hour to obtain a catalyst component-loaded cordieritic monolithic carrier having coating weight of 160 g/L and palladium loading amount of 40 g/cf (1.41 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

EXAMPLE 12

Except that $Co_{0.3}Al_{2.0}O_x$ prepared by using 291 parts of cobalt nitrate was used instead of nickel nitrate, a catalyst for the purification of exhaust gas was prepared in the same manner as in Example 11.

EXAMPLE 13

Except that $Zn_{0.3}Al_{2.0}O_x$ prepared by using 299 parts of zinc nitrate was used instead of nickel nitrate, a catalyst for the purification of exhaust gas was prepared in the same manner as in Example 11.

EXAMPLE 14

Except that $Co_{0.1}Ni_{0.3}Al_{2.0}O_x$ prepared by using 291 parts of nickel nitrate and 97 parts of cobalt nitrate was used instead of nickel nitrate, a catalyst for the purification of exhaust gas was prepared in the same manner as in Example 11.

EXAMPLE 15

Except that $Zn_{0.1}Ni_{0.3}Al_{2.0}O_x$ prepared by using 291 parts of nickel nitrate and 100 parts of zinc nitrate was used instead of nickel nitrate, a catalyst for the purification of exhaust gas was prepared in the same manner as in Example 11.

EXAMPLE 16

Except that $Zn_{0.1}Co_{0.1}Ni_{0.3}Al_{2.0}O_x$ prepared by using 291 parts of nickel nitrate, 100 parts of zinc nitrate and 97 parts of cobalt nitrate was used instead of nickel nitrate, a catalyst for the purification of exhaust gas was prepared in the same manner as in Example 11.

EXAMPLE 17

Except that $Ni_{0.7}Al_{2.0}O_x$ obtained with 679 parts of nickel nitrate was used, a catalyst for the purification of exhaust gas was prepared in the same manner as in Example 11.

EXAMPLE 18

Except that $Ni_{0.3}Al_{2.0}O_x$ obtained with 291 parts of nickel nitrate was used, a catalyst for the purification of exhaust gas was prepared in the same manner as in Example 11.

EXAMPLE 19

Except that the applied amount of barium acetate was changed to have the resulting catalyst contain 5 g/L of BaO, a catalyst for the purification of exhaust gas was prepared in the same manner as in Example 11.

EXAMPLE 20

Except that the applied amount of barium acetate was changed to have the resulting catalyst contain 25 g/L of BaO, a catalyst for the purification of exhaust gas was prepared in the same manner as in Example 11.

EXAMPLE 21

137 parts of zirconium acetate was dissolved in 500 parts of pure water, and then 1000 parts of activated alumina was immersed in this solution, which was dried at 150° C. for 24 hours, and thereafter, calcined at 400° C. for 2 hours, then at 1000° C. for 2 hours to obtain Zr 3 mol %-added alumina powder (Powder H). This Zr 3 mol %-added alumina powder (Powder H) was immersed in an aqueous solution of rhodium nitrate, and dried and calcined at 400° C. for 2 hours to obtain Rh-loaded, Zr 3 mol %-added alumina powder (Powder I). The concentration of Pd in this powder I was 1.06 weight %.

Then, 135 parts of the above powder I which was loaded with 1.06 weight % of rhodium, 450 parts of the above powder H, 400 parts of zirconium oxide powder (Powder J) which contains 1 mol % (2 weight % when converted to $La_2O_3$) of lanthanum and 20 mol % (13 weight % when converted to $CeO_2$) of cerium, 15 parts of activated alumina, and 1000 parts of nitric acid aqueous solution were charged into a porcelain ball mill, mixed and ground to obtain a slurry. The resulting slurry was applied onto the catalyst component-loaded cordieritic monolithic carrier (1.3 L, 400 cells), which was obtained in Example 1 and having coating weight of 175 g/L (palladium-containing coating layer of 160 g/L, palladium loading amount of 40 g/cf (1.41 g/L), BaO of 15 g/L), and calcined at 400° C. for 1 hour to obtain a catalyst for the purification of exhaust gas having total coating weight of 225 g/L (rhodium-containing, catalyst component-loaded layer of 50 g/L), palladium loading amount of 40 g/cf (1.41 g/L), and rhodium loading amount of 2 g/cf (0.071 g/L).

EXAMPLE 22

The rhodium-containing slurry obtained in Example 21 was applied onto a catalyst component-loaded cordieritic monolithic carrier (1.3 L, 400 cells), which was obtained in the same manner as in Example 1 and having coating weight of 160 g/L and palladium loading amount of 40 g/cf (1.41 g/L), and calcined at 400° C. for 1 hour to obtain a catalyst component-loaded cordieritic monolithic carrier having total coating weight of 210 g/L (rhodium-containing layer of 50 g/L), palladium loading amount of 40 g/cf (1.41 g/L), and rhodium loading amount of 2 g/cf (0.07 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

EXAMPLE 23

700 parts of the above powder C which was loaded with 1.0 weight % of palladium, 480 parts of another powder (Powder D) which is cerium oxide powder containing 1 mol % (2 weight % when converted to $La_2O_3$) of lanthanum and 32 mol % (25 weight % when converted to $ZrO_2$) of zirconium and loaded with 0.75 parts by weight of palladium, 135 parts of the above Zr 3 mol %-added alumina powder (Powder I) which was loaded with 1.06 weight % of rhodium, 450 parts of the above Zr 3 mol %-addedalumina powder (Powder H), 400 parts of zirconium oxide powder (Powder J) which contains 1 mol % (2 weight % when converted to $La_2O_3$) of lanthanum and 20 mol % (13 weight % when converted to $CeO_2$) of cerium, 35 parts of activated alumina, and 2200 parts of nitric acid aqueous solution were charged into a porcelain ball mill, mixed and ground to obtain a slurry.

The resulting slurry was applied onto a cordieritic monolithic carrier (1.3 L, 400 cells), and dried and calcined at 400° C. for 1 hour to obtain a catalyst component-loaded cordieritic monolithic carrier having coating weight of 210 g/L, palladium loading amount of 40 g/cf (1.41 g/L), and rhodium loading amount of 2 g/cf (0.071 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

EXAMPLE 24

700 parts of the above powder C which was loaded with 1.0 weight % of palladium, 480 parts of another powder (Powder D) which is cerium oxide powder containing 1 mol % (2 weight % when converted to $La_2O_3$) of lanthanum and 32 mol % (25 weight % when converted to $ZrO_2$) of zirconium and loaded with 0.75 parts by weight of palladium, 20 parts of activated alumina, and 1200 parts of nitric acid aqueous solution were charged into a porcelain ball mill, mixed and ground to obtain a slurry. The resulting slurry was applied onto a cordieritic monolithic carrier (1.3 L, 400 cells), and calcined at 400° C. for 1 hour to obtain a catalyst component-loaded cordieritic monolithic carrier having coating weight of 160 g/L and palladium loading amount of 40 g/cf (1.41 g/L).

Next, 135 parts of the above Zr 3 mol %-added alumina powder (Powder I) which was loaded with 1.06 weight % of rhodium, 450 parts of the above Zr 3 mol %-added alumina powder (Powder H), 400 parts of zirconium oxide powder (Powder J) which contains 1 mol % (2 weight % when converted to $La_2O_3$) of lanthanum and 20 mol % (13 weight % when converted to $CeO_2$) of cerium, 15 parts of activated alumina, and 1000 parts of nitric acid aqueous solution were charged into a porcelain ball mill, mixed and ground to obtain a slurry. The resulting slurry was applied onto the above palladium-loaded cordieritic monolithic carrier (1.3 L, 400 cells), and calcined at 400° C. for 1 hour to obtain a catalyst component-loaded cordieritic monolithic carrier having total coating weight of 210 g/L (palladium-containing layer of 160 g/L and rhodium-containing layer of 50 g/L), palladium loading amount of 40 g/cf (1.41 g/L), and rhodium loading amount of 2 g/cf (0.07 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

COMPARATIVE EXAMPLE 1

Except that $Ni_{0.5}Al_{2.0}O_x$ prepared by using 2500 parts of aluminum nitrate instead of alumina sol was used, a catalyst for the purification of exhaust gas was prepared in the same manner as in Example 1.

COMPARATIVE EXAMPLE 2

Except that $Ni_{0.5}Al_{2.0}O_x$ prepared by using 1700 parts of activated aluminum ($Al_2O_3$) and 485 parts of nickel nitrate instead of alumina sol was used, a catalyst for the purification of exhaust gas was prepared in the same manner as in Example 1.

COMPARATIVE EXAMPLE 3

Except that activated aluminum ($Al_2O_3$) was used instead of $Ni_{0.5}Al_{2.0}O_x$, a catalyst for the purification of exhaust gas was prepared in the same manner as in Example 1.

COMPARATIVE EXAMPLE 4

Except that $Ni_{1.2}Al_{2.0}O_x$ obtained with 1164 parts of nickel nitrate and 1700 parts of alumina sol was used, a catalyst for the purification of exhaust gas was prepared in the same manner as in Example 1.

COMPARATIVE EXAMPLE 5

Except that cerium oxide ($CeO_2$) powder was used instead of zirconium-containing cerium oxide powder, a catalyst for the purification of exhaust gas was prepared in the same manner as in Example 1.

COMPARATIVE EXAMPLE 6

Except that BaO was not contained, a catalyst for the purification of exhaust gas was prepared in the same manner as in Example 1.

COMPARATIVE EXAMPLE 7

Except that 30 g/L of BaO and 30 g/L of $K_2O$ were contained, a catalyst for the purification of exhaust gas was prepared in the same manner as in Example 1.

COMPARATIVE EXAMPLE 8

135 parts of the above Zr 3 mol %-added alumina powder (Powder I) which was loaded with 1.06 weight % of rhodium, 450 parts of the above Zr 3 mol %-added alumina powder (Powder H), 400 parts of zirconium oxide powder (Powder J) which contains 1 mol % (2 weight % when converted to $La_2O_3$) of lanthanum and 20 mol % (13 weight % when converted to $CeO_2$) of cerium, 15 parts of activated alumina, and 1000 parts of nitric acid aqueous solution were charged into a porcelain ball mill, mixed and ground to obtain a slurry. The resulting slurry was applied onto a cordieritic monolithic carrier (1.3 L, 400 cells), and calcined at 400° C. for 1 hour to obtain a catalyst rhodium-loaded cordieritic monolithic carrier having coating weight of 50 g/L and rhodium loading amount of 2 g/cf (0.071 g/L).

Next, 700 parts of the above Ce.Zr-added nickel aluminate powder which was loaded with 1.0 weight % of palladium (Powder C), 480 parts of another powder (Powder D) which is cerium oxide powder containing 1 mol % (2 weight % when converted to $La_2O_3$) of lanthanum and 32 mol % (25 weight % when converted to $ZrO_2$) of zirconium and loaded with 0.75 parts by weight of palladium, 20 parts of activated alumina, and 1200 parts of nitric acid aqueous solution were charged into a porcelain ball mill, mixed and ground to obtain a slurry. The resulting slurry was applied onto the above rhodium-loaded cordieritic monolithic carrier (1.3 L, 400 cells), and calcined at 400° C. for 1 hour to obtain a catalyst component-loaded cordieritic monolithic carrier having total coating weight of 210 g/L (rhodium-containing layer of 50 g/L and palladium-containing layer of 160 g/L), palladium loading amount of 40 g/cf (1.41 g/L), and rhodium loading amount of 2 g/cf (0.07 g/L).

Thereafter, the above catalyst component-loaded cordieritic monolithic carrier was immersed in a barium acetate solution, and then calcined at 400° C. for 1 hour to obtain a catalyst for the purification of exhaust gas which contains 15 g/L of BaO.

In Table 1 are shown the compositions of the catalysts for the purification of exhaust gas obtained in the above Examples 1–24 and Comparative Examples 1–8.

TABLE 1

| Catalyst | Metallic Aluminate | | (g/L) | |
| --- | --- | --- | --- | --- |
| | $[X]_aAl_{2.0}O_x$ | Pd | Rh | BaO |
| Example 1 | Alumina Sol + Nickel Nitrate, Ammonia Water; $Pd/Ni_{0.5}Al_{2.0}O_x + Pd/ZrO_2.CeO_2$ | 1.41 | 0.0 | 15.0 |
| Example 2 | Alumina Sol + Cobalt Nitrate, Ammonia Water; $Pd/Co_{0.3}Al_{2.0}O_x$ | 1.41 | 0.0 | 15.0 |
| Example 3 | Alumina Sol + Zinc Nitrate, Ammonia Water; $Pd/Zn_{0.3}Al_{2.0}O_x$ | 1.41 | 0.0 | 15.0 |
| Example 4 | Alumina Sol + Nickel Nitrate + Cobalt Nitrate, Ammonia Water; $Pd/Co_{0.1}NI_{0.3}Al_{2.0}O_x$ | 1.41 | 0.0 | 15.0 |
| Example 5 | Alumina Sol + Nickel Nitrate + Zinc Nitrate, Ammonia Water; $Pd/Zn_{0.1}NI_{0.3}Al_{2.0}O_x$ | 1.41 | 0.0 | 15.0 |
| Example 6 | Alumina Sol + Nickel Nitrate + Cobalt Nitrate + Zinc Nitrate, Ammonia Water; $Pd/Zn_{0.1}Co_{0.1}NI_{0.3}Al_{2.0}O_x$ | 1.41 | 0.0 | 15.0 |
| Example 7 | Alumina Sol + Nickel Nitrate, Ammonia Water; $Pd/Ni_{0.7}Al_{2.0}O_x$ | 1.41 | 0.0 | 15.0 |
| Example 8 | Alumina Sol + Nickel Nitrate, Ammonia Water; $Pd/Ni_{0.3}Al_{2.0}O_x$ | 1.41 | 0.0 | 15.0 |
| Example 9 | Alumina Sol + Nickel Nitrate, Ammonia Water; $Pd/Ni_{0.5}Al_{2.0}O_x$ | 1.41 | 0.0 | 5.0 |
| Example 10 | Alumina Sol + Nickel Nitrate, Ammonia Water; $Pd/Ni_{0.5}Al_{2.0}O_x$ | 1.41 | 0.0 | 25.0 |
| Example 11 | Alumina Sol + Nickel Nitrate; $Pd/Ni_{0.5}Al_{2.0}O_x$ | 1.41 | 0.0 | 15.0 |
| Example 12 | Alumina Sol + Cobalt Nitrate; $Pd/Co_{0.3}Al_{2.0}O_x$ | 1.41 | 0.0 | 15.0 |
| Example 13 | Alumina Sol + Zinc Nitrate; $Pd/Zn_{0.3}Al_{2.0}O_x$ | 1.41 | 0.0 | 15.0 |
| Example 14 | Alumina Sol + Nickel Nitrate + Cobalt Nitrate; $Pd/Co_{0.1}NI_{0.3}Al_{2.0}O_x$ | 1.41 | 0.0 | 15.0 |
| Example 15 | Alumina Sol + Nickel Nitrate + Zinc Nitrate; $Pd/Zn_{0.1}NI_{0.3}Al_{2.0}O_x$ | 1.41 | 0.0 | 15.0 |
| Example 16 | Alumina Sol + Nickel Nitrate + Cobalt Nitrate + Zinc Nitrate; $Pd/Zn_{0.1}Co_{0.1}NI_{0.3}Al_{2.0}O_x$ | 1.41 | 0.0 | 15.0 |
| Example 17 | Alumina Sol + Nickel Nitrate; $Pd/Ni_{0.7}Al_{2.0}O_x$ | 1.41 | 0.0 | 15.0 |
| Example 18 | Alumina Sol + Nickel Nitrate; $Pd/Ni_{0.3}Al_{2.0}O_x$ | 1.41 | 0.0 | 15.0 |
| Example 19 | Alumina Sol + Nickel Nitrate; $Pd/Ni_{0.5}Al_{2.0}O_x$ | 1.41 | 0.0 | 15.0 |
| Example 20 | Alumina Sol + Nickel Nitrate; $Pd/Ni_{0.5}Al_{2.0}O_x$ | 1.41 | 0.0 | 15.0 |
| Example 21 | Alumina Sol + Nickel Nitrate, Ammonia Water; Pd-containing layer + BaO + Rh-containing layer | 1.41 | 0.07 | 15.0 |
| Example 22 | Alumina Sol + Nickel Nitrate, Ammonia Water; Pd-containing layer + Rh-containing layer + BaO | 1.41 | 0.07 | 15.0 |

TABLE 1-continued

| Catalyst | Metallic Aluminate [X]$_a$Al$_{2.0}$O$_x$ | Pd (g/L) | Rh (g/L) | BaO (g/L) |
|---|---|---|---|---|
| Example 23 | Alumina Sol + Nickel Nitrate, Ammonia Water; Single layer containing both Pd and Rh + BaO | 1.41 | 0.07 | 5.0 |
| Example 24 | Alumina Sol + Nickel Nitrate; Pd-containing layer + BaO + Rh-containing layer | 1.41 | 0.07 | 25.0 |
| Comparative Example 1 | Aluminum Nitrate + Nickel Nitrate, Ammonia Water; Pd/Ni$_{0.5}$Al$_{2.0}$O$_x$ | 1.41 | 0.0 | 15.0 |
| Comparative Example 2 | Activated Alumina + Nickel Nitrate, Ammonia Water; Pd/Ni$_{0.5}$Al$_{2.0}$O$_x$ | 1.41 | 0.0 | 15.0 |
| Comparative Example 3 | Activated Alumina (Al$_{2.0}$O$_{3.0}$) ; Pd/Ni$_{0.5}$Al$_{2.0}$O$_x$ | 1.41 | 0.0 | 15.0 |
| Comparative Example 4 | Aluminum Nitrate + Nickel Nitrate, Ammonia Water; Pd/Ni$_{1.2}$Al$_{2.0}$O$_x$ | 1.41 | 0.0 | 15.0 |
| Comparative Example 5 | Aluminum Nitrate + Nickel Nitrate, Ammonia Water; Pd/Ni$_{0.5}$Al$_{2.0}$O$_x$ but Pd/CeO$_2$ | 1.41 | 0.0 | 15.0 |
| Comparative Example 6 | Aluminum Nitrate + Nickel Nitrate, Ammonia Water; Pd/Ni$_{0.5}$Al$_{2.0}$O$_x$ but without BaO | 1.41 | 0.0 | 0.0 |
| Comparative Example 7 | Aluminum Nitrate + Nickel Nitrate, Ammonia Water; Pd/Ni$_{0.5}$Al$_{2.0}$O$_x$ but with 30 g/L of BaO + 30 g/L of K$_2$O | 1.41 | 0.0 | BaO 30.0 K$_2$O 30.0 |
| Comparative Example 8 | Lower layer: Rh-containing layer + Upper layer: Pd-containing layer + BaO | 1.41 | 0.07 | 15.0 |

TEST EXAMPLE

With respect to each of the catalysts for the purification of exhaust gas obtained in the above Examples 1–24 and Comparative Examples 1–8, the test for evaluation of purification performance was made under the conditions shown below after aging was made under the following conditions.

| Aging conditions | |
|---|---|
| Displacement of engine: | 4400 cc |
| Fuel | Leadless gasoline |
| Catalyst inlet gas temperature | 800° C. |
| Aging Time | 100 hours |
| Inlet gas composition | |
| Co | 0.5 ± 0.1% |
| O$_2$ | 0.5 ± 0.1% |
| HC | about 1100 ppm |
| NO | 1300 ppm |
| CO$_2$ | 15% |
| Evaluation conditions 1: low temperature activity | |
| Displacement of engine: | 2000 cc |
| Fuel | Leadless gasoline |
| Increase rate of temperature | 10° C./min |
| Measured temperature range | 150° C.–500° C. |

Low temperature activity of each catalyst after aging is shown by a temperature (T50/° C.) at the time when the conversion of HC, CO, and NO$_x$ becomes 50%, respectively, and the results are shown in Table 2.

TABLE 2

| | T 50/ ° C. | | |
|---|---|---|---|
| Catalyst | HC | CO | NO$_x$ |
| Example 1 | 306 | 299 | 305 |
| Example 2 | 304 | 298 | 303 |
| Example 3 | 307 | 301 | 306 |
| Example 4 | 303 | 296 | 302 |
| Example 5 | 305 | 299 | 304 |
| Example 6 | 303 | 296 | 303 |
| Example 7 | 302 | 296 | 301 |
| Example 8 | 309 | 302 | 308 |

TABLE 2-continued

| | T 50/ ° C. | | |
|---|---|---|---|
| Catalyst | HC | CO | NO$_x$ |
| Example 9 | 308 | 301 | 307 |
| Example 10 | 305 | 299 | 305 |
| Example 11 | 312 | 305 | 311 |
| Example 12 | 310 | 305 | 309 |
| Example 13 | 313 | 306 | 312 |
| Example 14 | 309 | 312 | 308 |
| Example 15 | 311 | 306 | 310 |
| Example 16 | 310 | 313 | 310 |
| Example 17 | 307 | 301 | 306 |
| Example 18 | 315 | 308 | 316 |
| Example 19 | 314 | 307 | 314 |
| Example 20 | 311 | 305 | 311 |
| Example 21 | 297 | 290 | 295 |
| Example 22 | 301 | 294 | 299 |
| Example 23 | 302 | 295 | 300 |
| Example 24 | 302 | 295 | 301 |
| Comparative Example 1 | 321 | 314 | 320 |
| Comparative Example 2 | 358 | 354 | 360 |
| Comparative Example 3 | 343 | 334 | 332 |
| Comparative Example 4 | 353 | 349 | 355 |
| Comparative Example 5 | 358 | 349 | 347 |
| Comparative Example 6 | 341 | 334 | 340 |
| Comparative Example 7 | 382 | 377 | 379 |
| Comparative Example 8 | 305 | 299 | 305 |

| Evaluation conditions 2: Purification performance | |
|---|---|
| Displacement of engine: | 2000 cc |
| Fuel | Leadless gasoline |
| Catalyst inlet exhaust gas temperature | 500° C. |
| Stoichiometric atmosphere | Center A/F = 14.6 |
| | Amplitude ΔA/F = ± 1.0 |

Purification performance of each catalyst for the purification of exhaust gas after aging is evaluated by determining mean conversion (%) of each HC, CO and NO$_x$ in the stoichiometric atmosphere by the following formulae and the results are shown in Table 3.

$$NO_x \text{ conversion } (\%) = \frac{[(\text{Catalyst layer inlet } NO_x \text{ concentration}) - (\text{Catalyst layer outlet } NO_x \text{ concentration})]}{[\text{Catalyst layer inlet } NO_x \text{ concentration}]} \times 100$$

$$HC \text{ conversion } (\%) = \frac{[(\text{Catalyst layer inlet HC concentration}) - (\text{Catalyst layer outlet HC concentration})]}{[\text{Catalyst layer inlet HC concentration}]} \times 100$$

$$CO \text{ conversion } (\%) = \frac{[(\text{Catalyst layer inlet CO concentration}) - (\text{Catalyst layer outlet CO concentration})]}{[\text{Catalyst layer inlet CO concentration}]} \times 100$$

TABLE 3

| Catalyst | Conversion/% | | |
|---|---|---|---|
|  | HC | CO | $NO_x$ |
| Example 1 | 98 | 99 | 98 |
| Example 2 | 99 | 98 | 97 |
| Example 3 | 97 | 98 | 97 |
| Example 4 | 98 | 98 | 98 |
| Example 5 | 98 | 99 | 97 |
| Example 6 | 98 | 98 | 98 |
| Example 7 | 98 | 99 | 99 |
| Example 8 | 97 | 97 | 97 |
| Example 9 | 97 | 98 | 97 |
| Example 10 | 98 | 99 | 98 |
| Example 11 | 97 | 98 | 97 |
| Example 12 | 98 | 97 | 96 |
| Example 13 | 96 | 97 | 96 |
| Example 14 | 97 | 97 | 97 |
| Example 15 | 97 | 98 | 96 |
| Example 16 | 97 | 97 | 97 |
| Example 17 | 97 | 98 | 98 |
| Example 18 | 96 | 96 | 96 |
| Example 19 | 96 | 97 | 96 |
| Example 20 | 97 | 98 | 97 |
| Example 21 | 98 | 98 | 99 |
| Example 22 | 98 | 99 | 99 |
| Example 23 | 99 | 98 | 99 |
| Example 24 | 98 | 99 | 98 |
| Comparative Example 1 | 96 | 97 | 96 |
| Comparative Example 2 | 90 | 91 | 86 |
| Comparative Example 3 | 92 | 93 | 87 |
| Comparative Exmnple 4 | 89 | 90 | 86 |
| Comparative Example 5 | 83 | 83 | 78 |
| Comparative Example 6 | 80 | 85 | 79 |
| Comparative Example 7 | 71 | 75 | 70 |
| Comparative Example 8 | 98 | 99 | 98 |

As described above, the catalyst for the purification of exhaust gas according to the present invention has an excellent low temperature activity and can improve the catalyst performance of palladiumunder an oxygen-lacking atmosphere and in the vicinity of theoretical air-fuel ratio.

The catalyst for the purification of exhaust gas according to the present invention can also improve the structural stability of the alumina composite oxide at high temperatures.

In addition, sintering of palladium loaded on the alumina composite oxide can be controlled in the catalyst for the purification of exhaust gas according to the present invention and thus, the catalyst can have improved durability and low temperature activity.

Further, the catalyst for the purification of exhaust gas according to the present invention can suppress lowering of catalyst capacity due to reduction of catalyst components.

The catalyst for the purification of exhaust gas according to the present invention also has sufficient effects in increasing low temperature activity and $NO_x$ stationary conversion ability of palladium.

Moreover, the catalyst for the purification of exhaust gas according to the present invention can control adsorption poisoning by hydrocarbons as well as sintering of palladium.

In addition to the above stated effects, the catalyst for the purification of exhaust gas according to the present invention may have further improved low temperature activity and purification performance in an oxygen-lacking atmosphere owing to the promotive function of rhodium.

In the catalyst for the purification of exhaust gas according to the present invention, the oxidative state of rhodium is made suitable for purifying exhaust gas, and as a result, lowering of catalyst performance due to the reduction of rhodium can be suppressed.

Further, the catalyst for the purification of exhaust gas according to the present invention can optimize the arrangement of the palladium-containing layer and rhodium-containing layer within the catalyst components-loaded layer, thereby sufficiently improving the catalyst performance of palladium and rhodium.

The method of manufacturing the catalyst for the purification of exhaust gas according to the present invention can produce such a catalyst for the purification of exhaust gas that is excellent in uniformity of crystalline structure and heat resistance and having an excellent low temperature activity and catalyst performance.

The method of manufacturing the catalyst for the purification of exhaust gas according to the present invention can also produce such a catalyst for the purification of exhaust gas that has a sufficient BET specific surface area to secure superior dispersion and loading of palladium, thereby achieving an excellent catalytic activity.

Although the invention has been described with reference to specific preferred embodiments, they were given by way of examples only and thus, it should be noted that various changes and modifications may be made on them without departing from the scope of the present invention as defined by the appended claims.

What is claimed is:

1. A catalyst for the purification of exhaust gas in the form of monolithically-constructed catalyst with a catalyst component-loaded layer comprising at least palladium and metallic aluminate powder as catalyst components, wherein said metallic aluminate powder contains an alumina composite oxide having the following general formula:

$[X]_a Al_b O_c$ wherein, X is at least one element selected from the group consisting of cobalt, nickel and zinc, a, b and c show the atomic ratios of each element, a=0.1–0.8 when b=2.0, and c is an oxygen atomic number necessary for satisfying atomic valence of each of the above components.

2. The catalyst for the purification of exhaust gas as set forth in claim 1, wherein said alumina composite oxide containing at least one element selected from the group consisting of cobalt, nickel and zinc further contains at least one element selected from a group consisting of cerium and zirconium in an amount of 0.1–5 mol % at the metallic conversion with respect to the aluminum content.

3. The catalyst for the purification of exhaust gas as set forth in claim 1, further comprising cerium oxide containing 1–40 mol % of at least one element selected from the group consisting of lanthanum, neodymium and zirconium, and 60–98 mol % of cerium at the metallic conversion.

4. The catalyst for the purification of exhaust gas as set forth in claim 1, wherein said alumina composite oxide contains 30–80 weight % of palladium at the metallic conversion with respect to the total amount of palladium.

5. The catalyst for the purification of exhaust gas as set forth in claim 1, further comprising at least one element selected from the group consisting of alkali metal and alkaline earth metal.

6. The catalyst for the purification of exhaust gas as set forth in claim 1, further comprising rhodium and alumina powder.

7. The catalyst for the purification of exhaust gas as set forth in claim 6, further comprising a zirconium oxide containing 1–40 mol % of at least one element selected from the group consisting of lanthanum, neodymium and cerium, and 60–98 mol % of zirconium at the metallic conversion.

8. The catalyst for the purification of exhaust gas as set forth in claim 6, wherein a rhodium-containing layer and a palladium-containing layer are provided as a single layer.

9. The catalyst for the purification of exhaust gas as set forth in claim 6, wherein a rhodium-containing layer is arranged on top of a palladium-containing layer.

10. A method of manufacturing the catalyst for the purification of exhaust gas as claimed in claim 1 comprising obtaining an alumina composite oxide by dissolving or dispersing fine grain alumina hydrate colloid and a water-soluble salt of at least one selected from the group consisting of cobalt, nickel and zinc into water to form a precipitate, drying the precipitate by removing water, and then calcining the precipitate.

11. A method of manufacturing the catalyst for the purification of exhaust gas as claimed in claim 1 comprising obtaining an alumina composite oxide by dissolving or dispersing fine grain alumina hydrate colloid and a water-soluble salt of at least one selected from the group consisting of cobalt, nickel and zinc into water, adding thereto at least one aqueous solution selected from the group consisting of ammonia water, ammonium carbonate and ammonium hydrogencarbonate while regulating the pH of the solution within a range of 7.0–9.0 to form a precipitate, drying the precipitate by removing water, and then calcining the precipitate.

12. The method of manufacturing the catalyst for the purification of exhaust gas as set forth in claim 10, wherein said calcining is conducted at a temperature of 800° C. or higher.

13. The method of manufacturing the catalyst for the purification of exhaust gas as set forth in claim 11, wherein said calcining is conducted at a temperature of 800° C. or higher.

* * * * *